(12) United States Patent
Butala

(10) Patent No.: US 7,751,843 B2
(45) Date of Patent: Jul. 6, 2010

(54) REDUCING INTERFERENCE WITH A MULTIPLE FORMAT CHANNEL IN A COMMUNICATION SYSTEM

(75) Inventor: Amit Butala, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 10/209,163

(22) Filed: Jul. 29, 2002

(65) Prior Publication Data

US 2004/0203987 A1    Oct. 14, 2004

(51) Int. Cl.
H04B 7/00    (2006.01)

(52) U.S. Cl. ............... 455/522; 455/63.1; 455/67.13; 455/69; 370/318

(58) Field of Classification Search ............ 455/63.1, 455/67.13, 69, 522, 127.1, 127.2; 370/317, 370/318, 503
See application file for complete search history.

(56) References Cited

U.S. PATENT DOCUMENTS

| | | | |
|---|---|---|---|
| 4,696,027 A | 9/1987 | Bonta | |
| 5,287,544 A | 2/1994 | Menich et al. | |
| 5,551,057 A | 8/1996 | Mitra | |
| 6,377,555 B1 | 4/2002 | Lee | |
| 6,414,948 B1* | 7/2002 | Sato | 370/335 |
| 6,539,228 B1* | 3/2003 | Tateson | 455/446 |
| 6,571,089 B1* | 5/2003 | Richards et al. | 455/266 |
| 6,748,234 B1 | 6/2004 | Agrawal | |
| 6,983,166 B2 | 1/2006 | Shiu | |
| 6,985,457 B2* | 1/2006 | Zeira et al. | 370/318 |
| 7,035,284 B2 | 4/2006 | Willenegger | |
| 7,292,592 B2 | 11/2007 | Rune | |
| 7,406,065 B2 | 7/2008 | Willenegger | |
| 2001/0021229 A1 | 9/2001 | Belaiche et al. | |
| 2002/0094836 A1* | 7/2002 | Nakamura et al. | 455/522 |
| 2002/0131390 A1* | 9/2002 | Kuo et al. | 370/342 |
| 2002/0136193 A1* | 9/2002 | Chang et al. | 370/347 |
| 2003/0054849 A1* | 3/2003 | Koo et al. | 455/522 |
| 2003/0174686 A1 | 9/2003 | Willenegger | |
| 2003/0176202 A1* | 9/2003 | Bartl et al. | 455/522 |

FOREIGN PATENT DOCUMENTS

| | | |
|---|---|---|
| WO | 01/86834 | 11/2001 |
| WO | 02/43275 | 5/2002 |

(Continued)

OTHER PUBLICATIONS

International Search Report—PCT/US03/023858, International Search Authority—European Patent Office— Mar. 12, 2003.

(Continued)

Primary Examiner—Raymond S Dean
(74) Attorney, Agent, or Firm—Rupit M. Patel

(57) ABSTRACT

Techniques for reducing interference with a multiple format channel in a communication system are disclosed. In one aspect, a minimum power level is determined for each format transmitted during a transmission interval. The minumum power level for formats that will experience the interference are increased to compensate. The power level selected for transmission during the transmission interval is the most stringent of the minimum power levels. Various other aspects are also presented. These aspects have the benefit of mitigating the effects of a known interfering signal, while avoiding unnecessarily increasing transmit power, thus reducing the interference to other users and increasing system capacity.

31 Claims, 10 Drawing Sheets

FOREIGN PATENT DOCUMENTS

WO    02428242    5/2002

OTHER PUBLICATIONS

ETSI TS 125 211 v5.1.0, "Universal Mobile Telecommunications System (UMTS); Physical channels and mapping of transport channels onto physical channels (FDD)", (3GPP TS 25.211 version 5.1.0 Release 5) Jun. 2002.

ETSI TS 125 212 v5.1.0 "Universal Mobile Telecommunications System (UMTS); Multiplexing and channel coding (FDD)", (3GPP TS 25.212 version 5.1.0 Release 5) Jun. 2002.

ETSI TS 125 213 v5.1.0 "Universal Mobile Telecommunications System; Spreading and modulation (FDD)", (3GPP TS 25.213 version 5.1.0 Release 5) Jun. 2002.

ETSI TS 125 214 v5.1.0 "Universal Mobile Telecommunications System (UMTS); Physical layer procedures (FDD)", (3GPP TS 25.214 version 5.1.0 Release 5) Jun. 2002.

3GPP2 C.S0002-A, Version 6.0; "Physical Layer Standard for cdma2000 Spread Spectrum Systems" Feb. 8, 2002 Release A.

3GPP2 C.S0024 Version 3.0: "cdma2000 High Rate Packet Data Air Interface Specification", Dec. 5, 2001.

International Preliminary Examination Report—PCT/US03/023858, IPEA/US, Alexandria, VA Oct. 8, 2004.

* cited by examiner

REDUCING INTERFERENCE WITH A MULTIPLE FORMAT CHANNEL IN A COMMUNICATION SYSTEM

FIELD

The present invention relates generally to communications, and more specifically to a novel and improved method and apparatus for reducing interference with a multiple format channel in a communication system.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

In a CDMA system, the total available transmit power is allocated among the various users in the system. Therefore, system capacity is constrained by the amount of power transmitted to each user. Various power control techniques are known in the art and are used to reduce or limit the amount of power used by each user, thus increasing overall system capacity In a modern communication system, such as the W-CDMA system, various channels are multiplexed together and transmitted on a single physical channel. The exemplary W-CDMA system supports data transmission on one or more transport channels. One or more transport formats may be used for each transport channel. Each transport format defines various processing parameters such as the transmission time interval (TTI) over which the transport format applies, the size of each transport block of data, the number of transport blocks within each TTI, the coding scheme to be used for the TTI, and so on. The use of multiple transport formats allows different types or rates of data to be transmitted over a single transport channel. The transport channels can be multiplexed and transmitted on a single physical channel.

A power control mechanism for improving system performance and capacity for such multiple format systems is disclosed in co-pending U.S. patent application Ser. No. 09/933,604, entitled "POWER CONTROL FOR A CHANNEL WITH MULTIPLE FORMATS IN A COMMUNICATION SYSTEM", filed Aug. 20, 2001, assigned to the assignee of the present invention and incorporated by reference herein (hereinafter the '604 application).

It is also common in modern communication systems for various other channels to be transmitted in parallel with a physical channel using a common air link. Under certain circumstances, the channels may interfere with each other. For example, in the W-CDMA system, the sync channel is not constrained to be orthogonal to the other physical channels, and so may introduce interference to those channels. Various techniques for mitigating the effects of this type of interference are disclosed in co-pending U.S. patent application Ser. No. 10/118,691, entitled "METHOD AND APPARATUS FOR REDUCING INTERFERENCE IN A WIRELESS COMMUNICATION SYSTEM", U.S. patent application Ser. No. 10/118,722, entitled "METHOD AND APPARATUS FOR REDUCING INTER-CHANNEL INTERFERENCE IN A WIRELESS COMMUNICATION SYSTEM", U.S. patent application Ser. No. 10/118,686, entitled "METHOD AND APPARATUS FOR REDUCING INTER-CHANNEL INTERFERENCE IN A WIRELESS COMMUNICATION SYSTEM EMPLOYING A NON_PERIODIC INTERLEAVER", all filed Apr. 8, 2002, all assigned to the assignee of the present invention and incorporated by reference herein (hereinafter the '691 applications).

Power control can be used to overcome interference in certain situations, but not all transport channels or formats are necessarily suitable for power control. Increasing power for each frame, or the portion of each frame experiencing interference, is another alternative to overcome the interference. However, doing so may unnecessarily increase transmit power, thus reducing system capacity. There is therefore a need in the art for reducing interference with a multiple format channel in a communication system.

SUMMARY

Embodiments disclosed herein address the need in the art for reducing interference with a multiple format channel in a communication system. In one aspect, a minimum power level is determined for each format transmitted during a transmission interval. The minimum power level for formats that will experience the interference are increased to compensate. The power level selected for transmission during the transmission interval is the most stringent of the minimum power levels. Various other aspects are also presented. These aspects have the benefit of mitigating the effects of a known interfering signal, while avoiding unnecessarily increasing transmit power, thus reducing the interference to other users and increasing system capacity.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
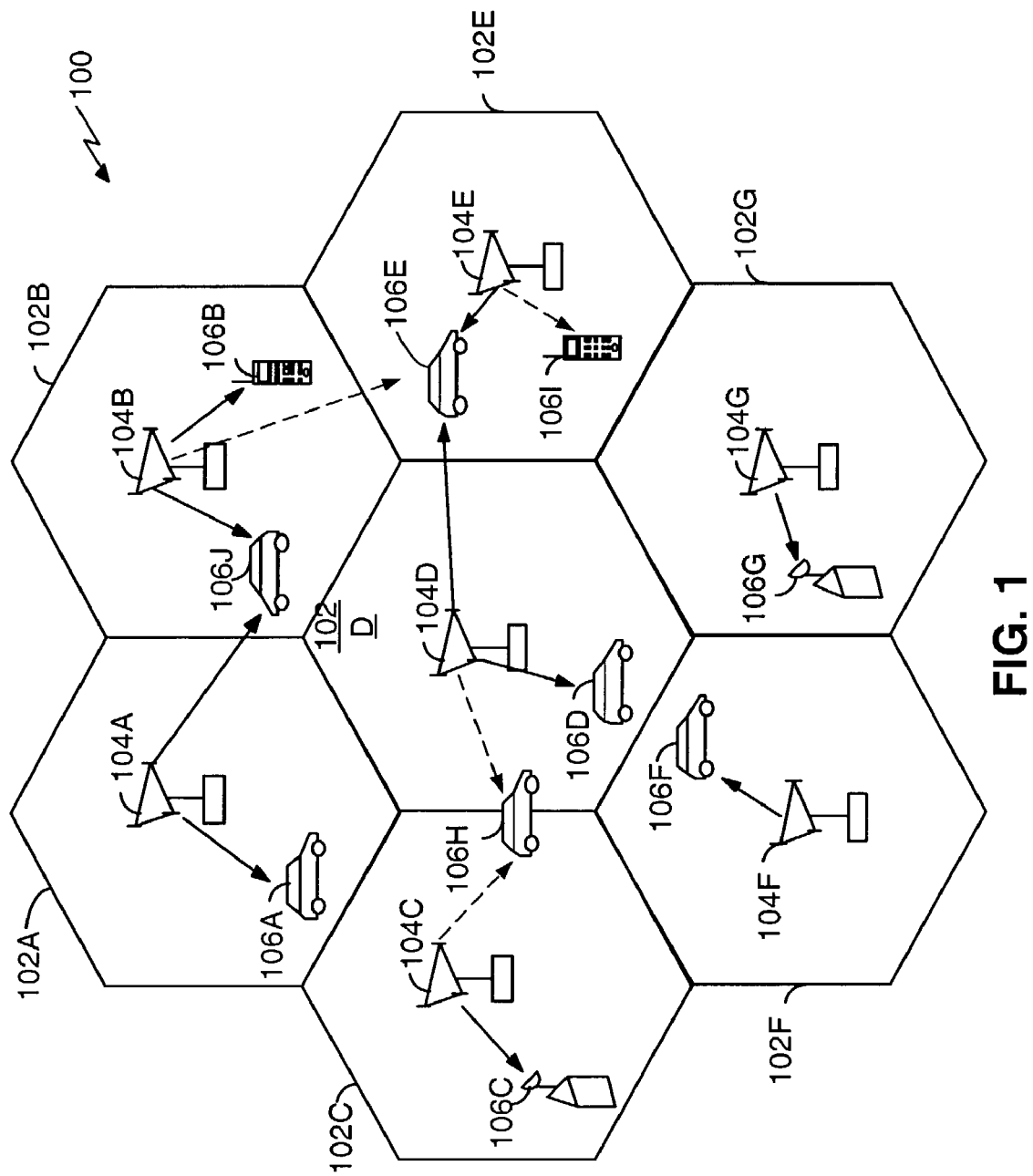
FIG. 1 is a general block diagram of a wireless communication system capable of supporting a number of users.

FIG. 1 is a diagram of a wireless communication system 100 that may be designed to support one or more standards and/or designs (e.g., the W-CDMA standard, the IS-95 standard, the cdma2000 standard, the HDR specification) and is capable of implementing at least some aspects of the embodiments discussed herein. Any of a variety of algorithms and methods may be used to schedule transmissions in system 100.

In the exemplary embodiment, wireless communication system 100 is a W-CDMA system. The W-CDMA specification details the formats and procedures for transmitting data on the uplink and the downlink. Some of these formats and procedures are detailed below. A W-CDMA system is described in the set of specification documents defined by 3GPP having address given as ETSI Mobile Competence Centre, 650, Route des Lucioles, 06921 Sophia-Antipolis Cedex, France.

Note that the exemplary embodiment is provided as an exemplar throughout this discussion; however, alternate embodiments may incorporate various aspects without departing from the scope of the present invention. Specifically, the various embodiments are applicable to a data processing system, a wireless communication system, a mobile IP network and any other system that would benefit from efficient use and management of resources.

System 100 provides communication for a number of cells 102A-102G, each of which is serviced by a corresponding base station 104A-104G, respectively. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term terminal can be used interchangeably with the terms user equipment (UE), mobile station, subscriber unit, subscriber station, access terminal, remote terminal, or other corresponding terms known in the art. The term mobile station encompasses fixed wireless applications.

In the exemplary embodiment, some of the base stations 104 have multiple receive antennas and others have only one receive antenna. Similarly, some of the base stations 104 have multiple transmit antennas, and others have single transmit antennas. There are no restrictions on the combinations of transmit antennas and receive antennas. Therefore, a base station 104 may have multiple transmit antennas and a single receive antenna, or may have multiple receive antennas and a single transmit antenna, or may utilize single antennas for both receive and transmit, or may utilize multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations.

Alternate embodiments may employ alternate communication systems wherein various channels interfere with each other in the system. In the W-CDMA system specifically, channels are coded and transmitted over a common air interface, wherein at least one of the channels is non-orthogonal to the other channels for at least a portion of the time. In a spread spectrum system, a common technique is to deploy orthogonal channels to avoid inter-channel interference. Therefore, the presence of a non-orthogonal channel causes inter-channel interference. The present invention is also applicable to any other system in which one or more channels present interference to other channels within the system.

Returning to FIG. 1, the downlink, also known as the forward link, refers to transmission from the base station 104 to the terminal 106, and the uplink, also known as the reverse link, refers to transmission from the terminal 106 to the base station 104. In FIG. 1, base station 104A transmits data to terminals 106A and 106J on the downlink, base station 104B transmits data to terminals 106B and 106J, base station 104C transmits data to terminal 106C, and so on.

For clarity, the examples used in describing this invention may assume base stations as the originator of signals and terminals as receivers and acquirers of those signals, i.e. signals on the forward link, or downlink. Those skilled in the art will understand that terminals as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
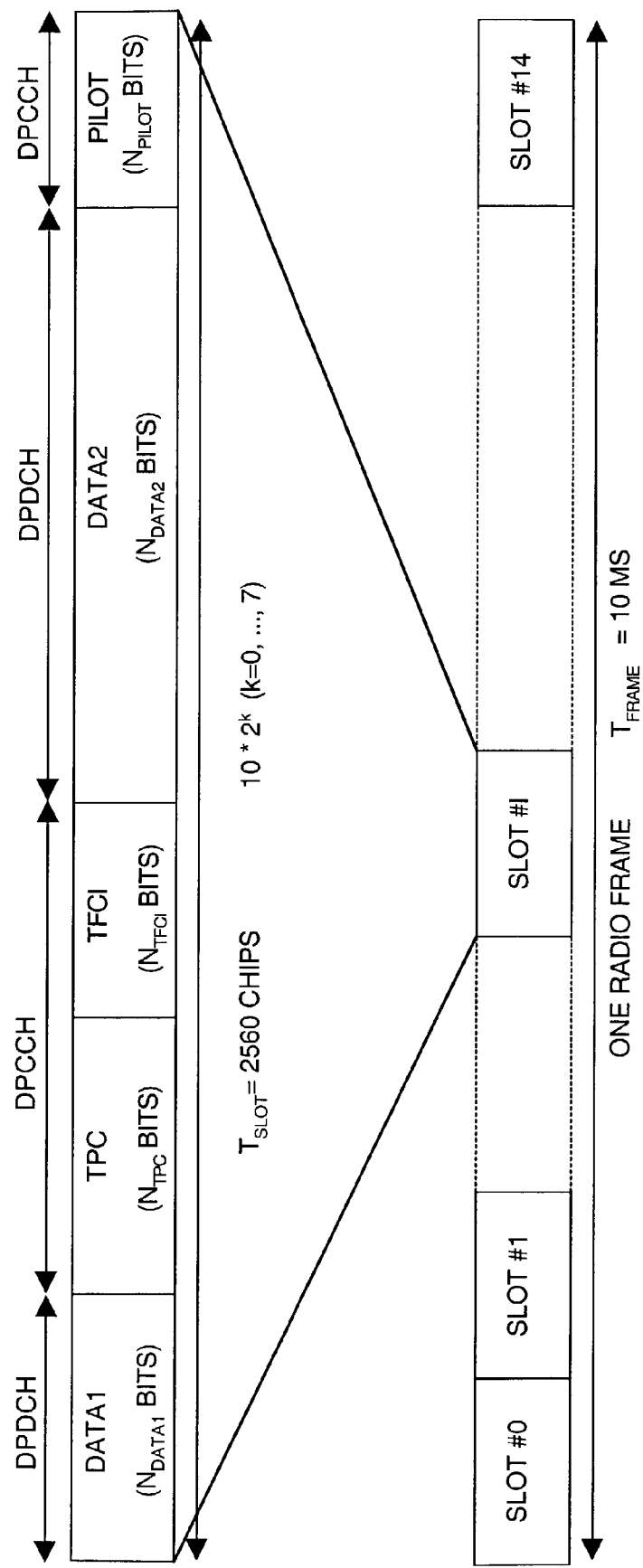
FIG. 2 illustrates a downlink dedicated physical channel.

FIG. 2 illustrates a downlink dedicated physical channel, the downlink Dedicated Physical Channel (DPCH) in a W-CDMA system. Multiple logical channels referred to as Transport Channels (TrCHs) are multiplexed to form one physical channel, i.e., DPCH. In other words, within one downlink DPCH, data generated at higher layers are multiplexed together. The dedicated transport channel (DCH) is transmitted in time-multiplex with control information, such as known pilot bits, Transmit Power Control (TPC) commands, and an optional Transport Format Combination Indicator (TFCI). The downlink DPCH therefore may be seen as a time multiplex of a downlink Dedicated Physical Data Channel (DPDCH) and a downlink Dedicated Physical Control Channel (DPCCH).

FIG. 2 illustrates the frame structure of the downlink DPCH. Each frame of length 10 ms is split into 15 slots, each of length $T_{SLOT}=2560$ chips, corresponding to one power-control period. As illustrated, the DPDCH portions alternate with DPCCH portions. In the example, a slot includes a first DPDCH portion of $N_{DATA1}$, bits of DATA1, followed by a DPCCH portion having $N_{TPC}$ bits of TPC and $N_{TFCI}$ bits of TFCI. The next portion is a DPDCH portion of DATA2 having $N_{DATA2}$ bits. The final portion is a DPCCH portion of PILOT having $N_{PILOT}$ bits.

The parameter k determines the total number of bits per downlink DPCH slot. The parameter k is related to the Spreading Factor (SF) of the physical channel, wherein $SF=512/2^k$. The spreading factor may thus range from 512 down to 4.

Figure 3:
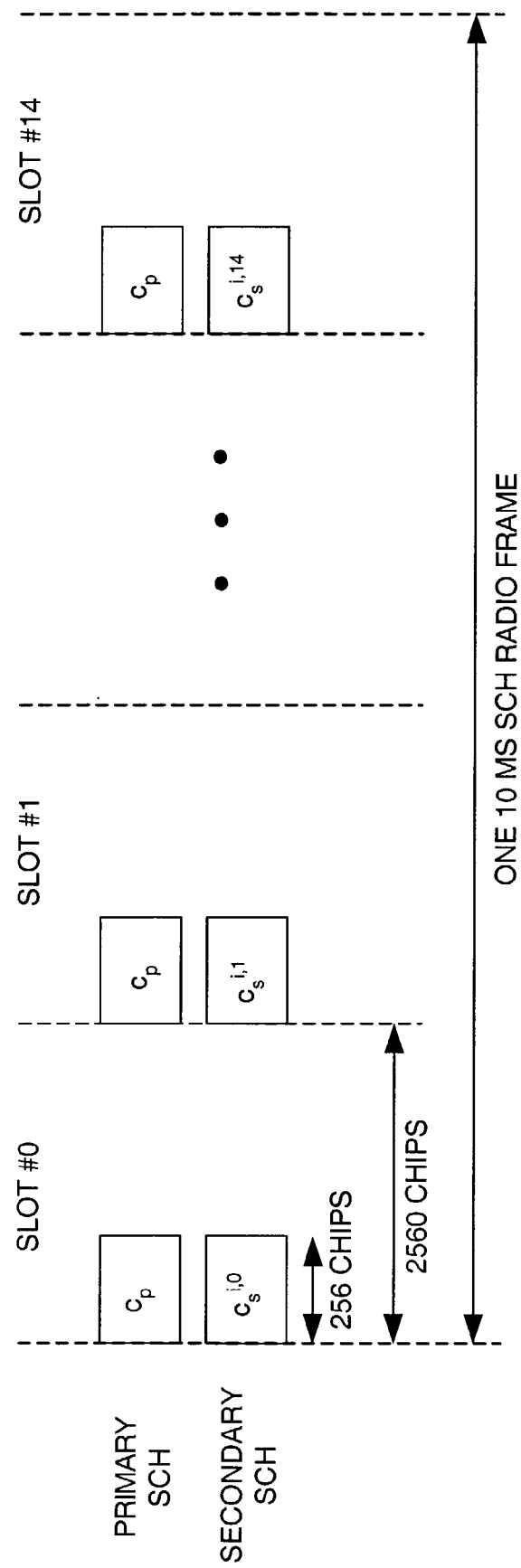
FIG. 3 illustrates the structure of the synchronization channel radio frame.

Also transmitted within the W-CDMA system is a synchronization sequence on a Synchronization Channel (SCH). Note that the synchronization sequence may be referred to as a synchronization message. As detailed in 3GPP TS 25.211, Section 5.3.3.5, the SCH is specified as non-orthogonal to the other channels and to the DPCH specifically. The SCH is a downlink signal used by the terminal (or UE) for cell search. The SCH consists of two sub channels, the Primary and Secondary SCH. The 10 ms radio frames of the Primary and Secondary SCH are divided into 15 slots, each of length 2560 chips. FIG. 3 illustrates the structure of the SCH radio frame. The Primary SCH consists of a modulated code of length 256 chips, the Primary Synchronization Code (PSC) denoted $c_p$, which is transmitted once each slot. The PSC is the same for each cell in the system.

The Secondary SCH consists of a repeated transmission of 15 consecutive sequences of modulated codes of length 256 chips, the Secondary Synchronization Codes (SSC), which are transmitted in parallel with the Primary SCH. The SSC is denoted $c_s^{i,k}$ in FIG. 3; wherein i=0,1, . . . , 63 and represents the number of the scrambling code group; and wherein k=0, 1, . . . , 14 and represents the slot number. Each SSC is chosen from a set of 16 different codes of length 256. This sequence on the Secondary SCH indicates to which of the code groups the cell's downlink scrambling code belongs. Note that the synchronization message is transmitted at a predetermined position within each slot. In this way, the synchronization message has a known occurrence. Since the downlink scrambling code and the SSC are known and repeat every radio frame, the interference is periodic and deterministic. Recall that the SCH is one example of an interference generating signal. The interference will be described more fully below. Note that, while the SCH is described as an exemplar, similar inter-channel interference may result from other channels.

Although the primary and secondary synchronization codes (PSC, SSC) structures, as described in 3GPP TS 25.213, are not orthogonal, they are designed to provide maximum isolation between the sync channel and the other downlink channels. The isolation depends on the spreading factor of the DPCH under consideration as well as the scrambling code segment covering the particular symbol.

Table 1 illustrates the worst case coded bit Signal-to-Noise Ratio (SNR) due to the SCH interference (in dB). The results assume equal power for transmission of the SCH and DPCH. The left column indicates the DPCH Spreading Factor (SF). The right column indicates the worst case SNR due to SCH interference to the DPCH. Note that the SNR bound will generally not improve when considering multi-path or transmit-diversity techniques as the SCH interference is deterministic and fully correlated.

TABLE 1

| DPCH Spreading Factor | Typical Worst Case SNR due to SCH Interference (dB) |
|---|---|
| 256 | 9.5 |
| 128 | 7.5 |
| 64 | 6.5 |
| 32 | 5 |
| 16 | 3.5 |
| 8 | 0.5 |
| 4 | 0 |

The SNR bound may become the limiting factor when considering high geometry. High geometry refers to the ratio of the total power received from the target cell to the total power received from all cells. The total power includes inteference, introduced both by the environment and by other transmission channels. The closer a terminal is to a base station, the higher the geometry. Note that, typically, channels within a cell are orthogonal (with the exception of special channels such as the SCH); however, from cell to cell, channels are not necessarily orthogonal. In this way, for a high geometry positions, the terminal only sees orthogonal channels as proximate the Node-B. The interference presented by a non-orthogonal channel, such as the SCH, is pronounced. In contrast, for a low geometry position, the terminal sees a lot of non-orthogonal interference as far from the Node-B. The SCH channel is not as pronounced at low geometry as the power of the SCH is added to the other interference making less difference. Coupled with the consideration that the SCH is transmitted at a same power level constantly, but the dedicated channel is transmitted according to the position of the terminal, the SCH has a greater impact at higher geometries.

The Universal Mobile Telecommunications System (UMTS) multiplexing and interleaving scheme is described in 3GPP TS 25.212. Various transport channels are first coded and interleaved separately on a per Transmission Time Interval (TTI) basis. Then the channels are multiplexed on a radio frame-by-frame basis, interleaved and mapped onto the physical channel payload.

Figure 4:
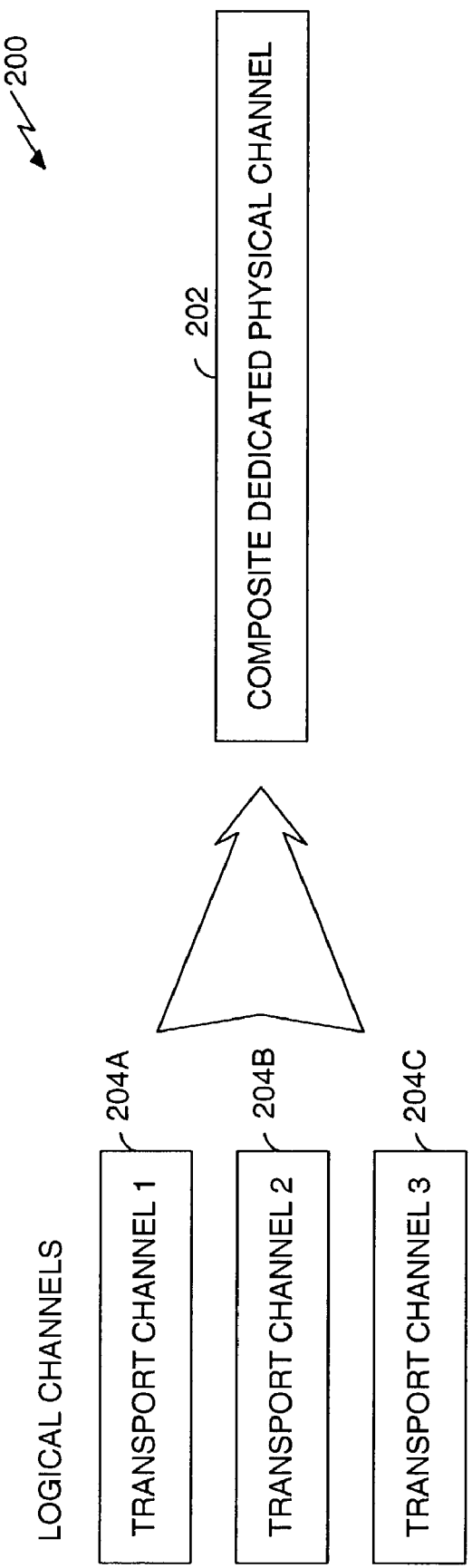
FIG. 4 illustrates the mapping of multiple logical channels onto a common physical channel.

FIG. 4 illustrates the mapping of multiple logical channels onto a common physical channel. The logical channels are illustrated as transport channel 1-3 (204A-C, respectively). The three transport channels 204A-C are mapped to a physical channel 202. The bits of each channel are interleaved separately. Recall that in a W-CDMA system, each frame includes 15 slots, wherein each slot includes 2560 chips. As described above with respect to FIG. 2, the data information is time multiplexed with control information which is provided at known intervals.

W-CDMA interleaving involves a first interleaver and a second interleaver. The first and second interleaving as defined to not mitigate against the interference as described more fully below. Due to the remaining periodicity of the channels subsequent to the interleaving, it will be shown that the interference may be concentrated in a single transport channel. Alternate systems may reduce the concentration of the interference among channels. However, the principles of the present invention apply in those circumstances as well.

Figure 5:
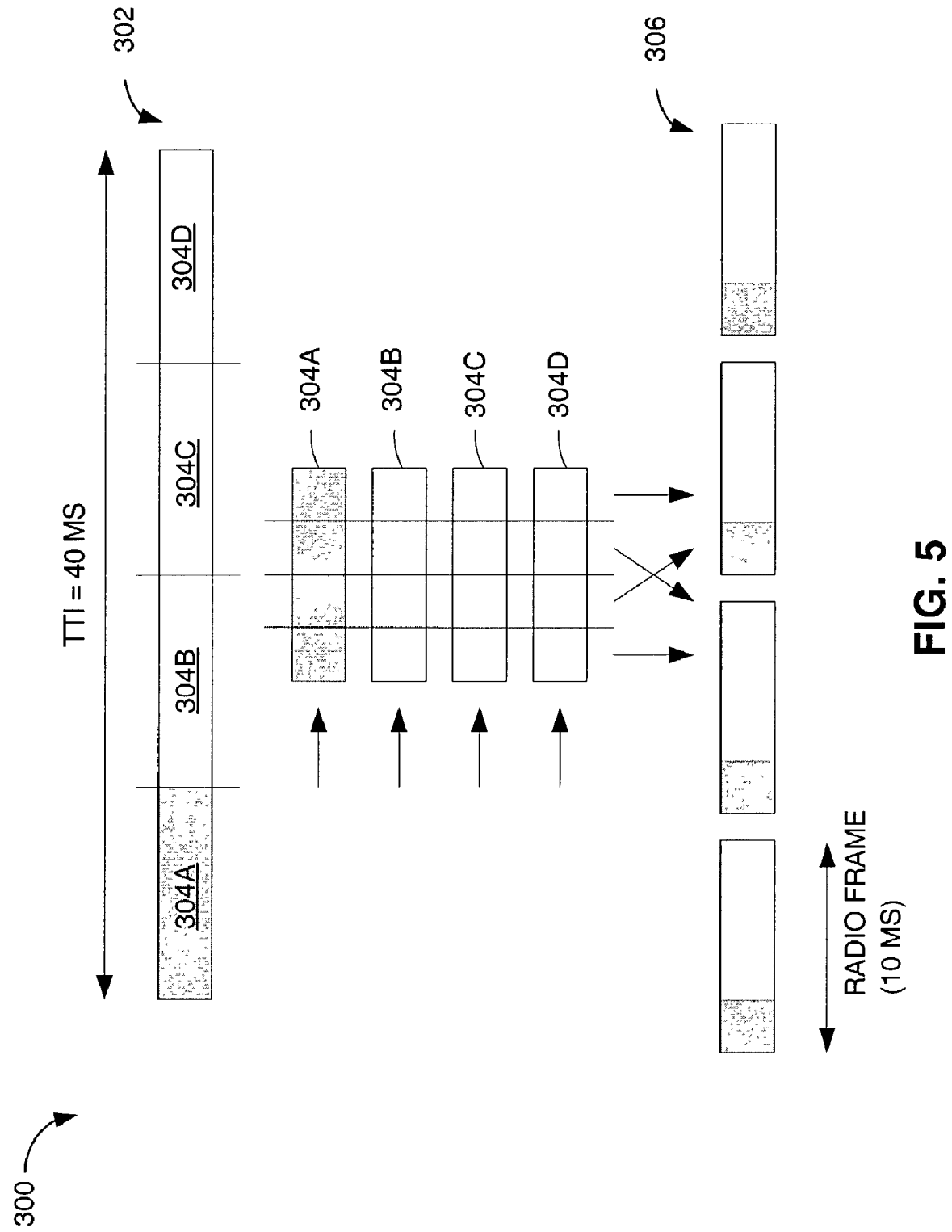
FIG. 5 illustrates a first interleaving procedure.

FIG. 5 illustrates the first interleaving procedure 300 with radio frame segmentation assuming a 40 ms TTI. The first interleaving procedure essentially ensures that the TTI bits are spread across multiple radio frames. The first interleaving procedure, however, does not affect the relative position of the bits within each radio frame compared to their relative position in the transport block as can be seen by the position of the gray areas in FIG. 5. As illustrated, a TTI of 40 ms includes four frames of 10 ms each. The TTI is identified as TTI 302. The frames are identified as frames 304A, 304B, 304C, and 304D. Each frame is then divided into four portions. The frame division is consistent with the number of frames per TTI. The portions of the frames are then interleaved together to form the radio frame stream 306. The shaded portion identifies the processing of a TTI frame 304A. The interleaving procedure 300 involves writing the TTI frames row by row, and then reading the frame portions column by column. The order of the interleaved portions is predetermined and predictable.

Figure 6:
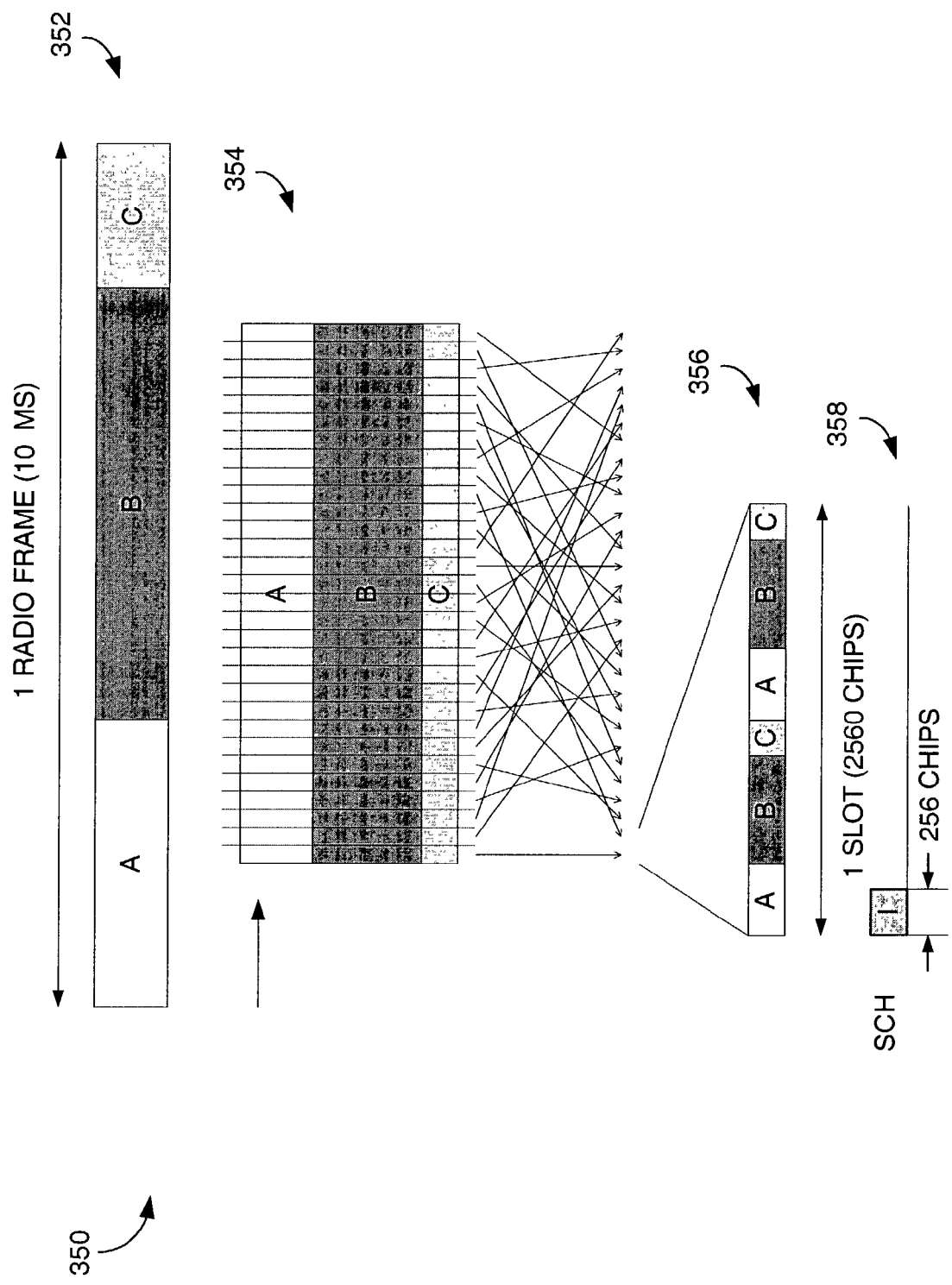
FIG. 6 illustrates a second interleaving procedure.

The interleaving procedure 350 of the second interleaver is illustrated in FIG. 6 for three transport channels. The interleaver is based on a 30 column matrix, wherein the number of columns is consistent with the number of slots per frame. From the radio frame 352, each frame is divided into 30 portions to form a matrix 354. The portions are then interleaved to form the final interleaved stream 356. The second interleaver ensures that some information from each transport channel appears in each slot. The second interleaver, however, does not change the relative position of each transport channel's information within each slot, with the exception that the periodicity of appearance of each transport channel is twice as high as the periodicity of the slot (3000 Hz vs. 1500 Hz).

The order in which the transport channels are mapped on the physical channel affect the absolute position of each transport channel but not the periodicity of appearance of data from each transport channel, which is always 3000 Hz. Further, the mapping order does not affect the fact that a particular transport channel information always appear in the same position within the slot.

In this example, radio frame 352 comprises three transport channels 352A-C, as shown in FIG. 6. The data from these transport channels is identified in matrix 354 as well as interleaved stream 356. Shown aligned with interleaved stream 356 is an SCH frame 358. As described above, the SCH is transmitted during the first 256 chips of SCH frame 358. This 256-chip portion is shaded and labeled I, to indicate the time period during which the SCH causes interference. In this example, it can be seen that transport channel A is the only transport channel experiencing interference. Transport channels B and C are outside the region of interference.

The general problem, as just described, is interference that occurs regularly and predictably. A few methods for mitigating this interference are disclosed in the '691 applications. The transmit power can be increased to overcome the interference. However, to do so during each frame, for the entire frame, will unnecessarily increase the transmit power and correspondingly reduce system capacity. It is also possible to boost power only during the portion of the frame during which the interference occurs, but this may also unnecessarily boost power (explained further below), also reducing system capacity. In addition, intra-frame power level adjustments, in addition to regular power control adjustments, may increase complexity.

Another method, disclosed in the '691 applications, is to perform power control on the weakest transport channel, i.e., the channel with the most stringent power requirement is used to set the power control target. However, as disclosed in the '604 application, not all transport channels are suitable for power control. For example, in a W-CDMA system, an Adaptive Multi-Rate (AMR) voice channel includes four channels, the A, B, and C channels, and the DCCH. The A channel always includes a CRC, and can be power controlled. The B and C channels never send a CRC, and are not power controlled. The DCCH sometimes includes a CRC, and sometimes does not (for example, when a do not transmit, or DTX, is sent). The W-CDMA specification precludes power control on channels that do not always send the CRC. Thus, AMR is one example where performing power control on the weakest link may not be a suitable remedy. Aspects of the present invention can certainly be integrated with power control systems, an exemplary embodiment is described below, but can also be deployed to mitigate the interference when it coincides with a transport channel that, for whatever reason, is not included in the power control mechanism.

One aspect of the invention determines the minimum power necessary for each transport channel being transmitted in a TTI. Since the interference is predictable, and may not affect all transport channels in a TTI, the transport channel or channels that is actually interfered with in a particular TTI is identified. The minimum power for those interfered with transport channels may be increased to compensate for the interference. Then, the transmit power is set for the TTI according to the largest minimum required power.

Note that, in the exemplary W-CDMA system, the power is set for a TTI according to the various formats included in that TTI. Thus, in various combinations of transport channels, the transport channel interfered with may not have the highest power requirement in the TTI, and therefore, absent any necessary adjustment for the interference, would not determine the transmit power level for the TTI. In some cases, due to the higher power level requirements of other transport channels in the TTI, those which do not experience the interference, there is no need to increase the transmit power level in a frame at all to maintain the desired quality of service levels for each transport channel in the TTI. In other cases, where the transmit power level of the TTI is higher than the required level of the interfered with transport channels, but lower than amount needed to fully compensate for the interference, the transmit power level for the TTI may need to be increased to compensate, but at a lesser amount than a generalized offset for interference compensation. In these cases, it can be seen that no power increase, or a lesser power increase, is necessary, and this compares favorably with increasing the power for every entire frame, or even for a portion of every frame, as described above.

Figure 7:
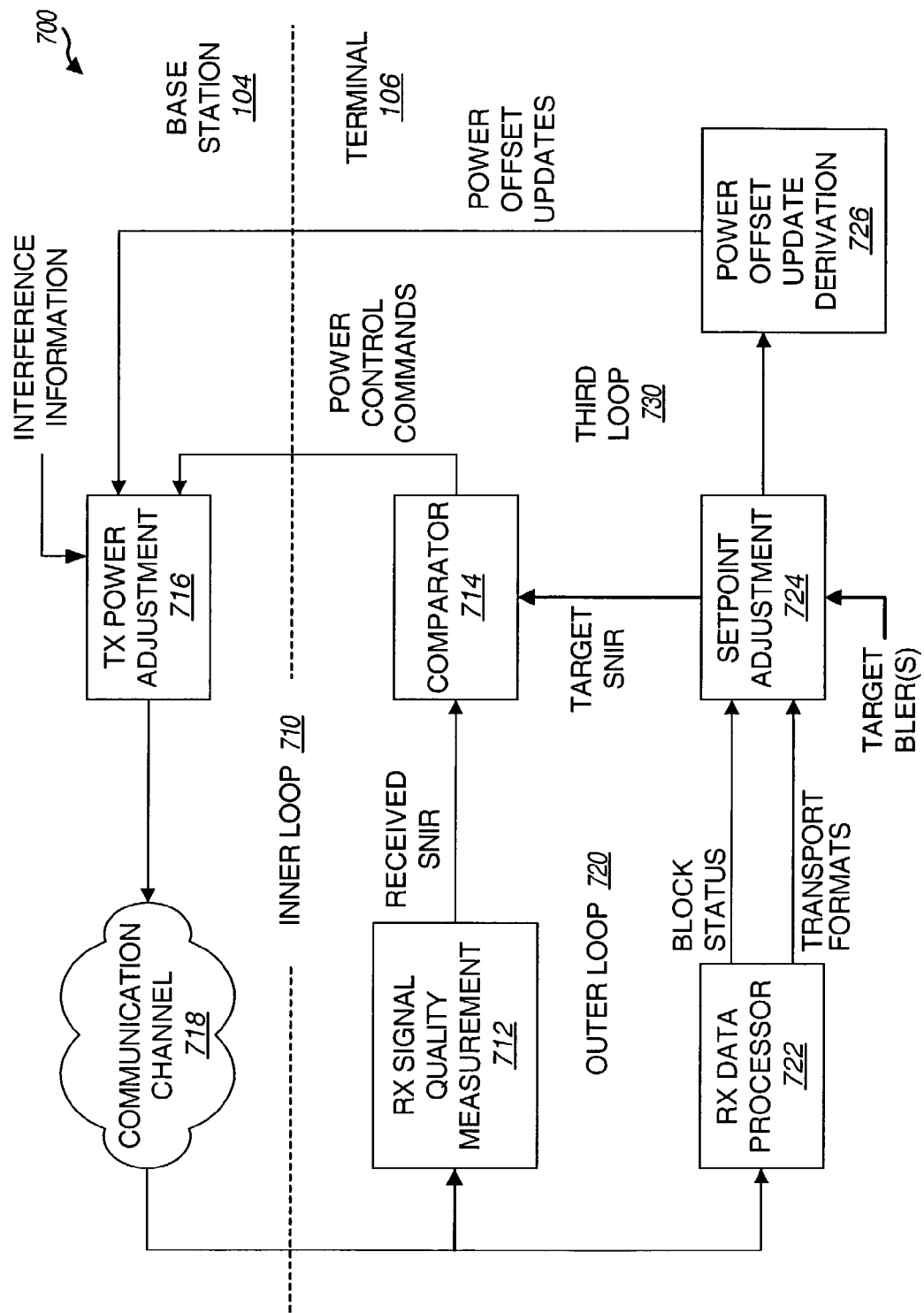
FIG. 7 is a diagram of an embodiment of a downlink power control mechanism.

FIG. 7 is a diagram of an embodiment of downlink power control mechanism 700. Power control mechanism 700 includes an inner power control loop 710 that operates in conjunction with an outer power control loop 720. A similar mechanism, without the benefits of the present invention, is described in the '604 application.

Inner loop 710 is a (relatively) fast loop that attempts to maintain the signal quality of a data transmission received at the terminal as close as possible to a target Signal-to-Noise-plus-Interference Ratio (SNIR) (i.e., a setpoint). As shown in FIG. 7, inner loop 710 operates between the base station (such as base station 104) and the terminal (such as terminal 106), and one inner loop is typically maintained for each data transmission to be independently power-controlled.

The inner loop adjustment for a particular data transmission is typically achieved by (1) measuring the signal quality of the data transmission at the terminal (block 712), (2) comparing the received signal quality (i.e., the received SNIR) against the target SNIR (block 714), and (3) sending power control information back to the transmitting base station. The signal quality measurement is typically made on a pilot included in the data transmission. The power control information may be used by the base station to adjust its transmit power for the data transmission, and may be in the form of an "UP" command to request an increase in the transmit power or a "DOWN" command to request a decrease in the transmit power. The base station may adjust the transmit power for the data transmission accordingly (block 716) each time it receives the power control information. For the W-CDMA system, the power control information may be sent as often as 1500 times per second (i.e., one power control command for each slot), thus providing a relatively fast response time for inner loop 710. In addition, as described more fully below, the transmit power may be adjusted according to the location of the interfering signal, as necessary.

Due to path loss, fading, and possibly other phenomena in the communication channel (cloud 718), which typically varies over time, especially for a mobile terminal, the received SNIR at the terminal continually fluctuates. Inner loop 710 attempts to maintain the received SNIR at or near the target SNIR in the presence of changes in the communication channel.

Outer loop 720 is a (relatively) slower loop that continually adjusts the target SNIR such that the desired level of performance is achieved for the data transmission to the terminal.

The desired level of performance is typically specified as a particular target Block Error Rate (BLER), although some other performance criterion may also be used to adjust the target SNIR. The target SNIR necessary to maintain a particular target BLER may change depending on the conditions of the communication channel. For example, a fast fading channel may have a different SNIR target than a slow fading channel to maintain the same BLER.

The outer loop adjustment for the SNIR target is typically achieved by (1) receiving and processing the data transmission to recover transmitted data blocks (or transport blocks), (2) determining the status of each received transport block (block 722) as being decoded correctly (good) or in error (erased), and (3) adjusting the target SNIR (block 724) based on the transport block status (and optionally along with other information, as described below). If a transport block is decoded correctly, then the received SNIR at the terminal is likely to be higher than necessary and the target SNIR may be reduced slightly. Alternatively, if a transport block is decoded in error, then the received SNIR at the terminal is likely to be lower than necessary and the target SNIR may be increased. In either scenario, inner loop 710 will try to keep the received SNIR at the target SNIR provided by the outer loop.

By controlling the manner in which the target SNIR is adjusted, different power control characteristics and performance level may be obtained. For example, the target BLER may be adjusted by selecting the proper amount of upward adjustment ($\Delta$UP) in the target SNIR for a bad block, the amount of downward adjustment ($\Delta$DN) for a good block, the required elapsed time between successive increases in the target SNIR, and so on. The target BLER (i.e., the long-term BLER) may be set as $\Delta$DN/($\Delta$DN+$\Delta$UP). The magnitudes of $\Delta$UP and $\Delta$DN also determine the responsiveness of the power control mechanism to sudden changes in the communication channel.

For the W-CDMA system, the terminal can estimate the received SNIR of the transmission on the downlink DPCH (or more specifically, the dedicated pilot on the DPCCH). The terminal then compares the received SNIR to the target SNIR and generates TPC commands to increase (or decrease) the transmit power if the received SNIR is less than (or greater than) the target SNIR. In response to receiving the TPC commands, the base station may adjust the transmit power of the downlink DPCH.

In the W-CDMA system, for any given transport channel, the base station can specify to the terminal a particular target BLER. For data integrity, the actual BLER should not exceed the target BLER. At the same time, the actual BLER should not consistently fall below the target BLER, since that would imply excess transmit power is used for the data transmission, which would then reduce the capacity of the transmitting base station and may further cause unnecessary interference to neighboring cells.

The terminal and base station attempt to achieve and maintain the target BLER specified for the transport channel through the power control mechanism described above. For a transport channel with only one transport format (i.e., transport blocks of equal sizes, which translates into code blocks of uniform lengths), a steady state condition in the power control is reached when the outer and inner loops converge on the target SNIR required (under the given channel conditions) to provide the target BLER for the (one) transport format used for the transport channel. A power control mechanism that maintains one individual outer loop for each transport channel is described in U.S patent application Ser. No. 09/718, 316, entitled "METHOD AND APPARATUS FOR POWER CONTROL IN A WIRELESS COMMUNICATION SYSTEM," filed Nov. 21, 2000, assigned to the assignee of the present application.

However, in W-CDMA, data may be transmitted on a given transport channel using many possible transport formats. For example, on a transport channel for a voice call, shorter transport blocks may be sent when there is no voice activity and longer transport blocks may be sent when there is voice activity. The SNIR required to achieve the target BLER may be very different for code blocks of different lengths, and thus the required SNIRs may be different for different transport formats.

The W-CDMA standard currently allows one target BLER to be specified for each transport channel regardless of the number of transport formats that may be used for this transport channel. Since different transport formats may require different target SNIRs to meet the target BLER as described above, this W-CDMA specification is not precise. The average transmit power will likely fluctuate depending on the relative frequency and/or order of succession of the transport formats used for the transport channel.

If the outer loop converges on the target SNIR for a particular transport format, and if the transport format is then changed, a transient time is typically required for the outer loop to converge again to the new target SNIR for the new transport format. During this transient time, the actual BLER may be much greater or less than the target BLER. For a data transmission that uses a mix of transport formats, the duty cycle as well as the period of the duty cycle of the transport formats may determine different values for the required target SNIRs. For example, the outer loop will likely converge on different sets of required SNIRs for the case of 10 TTIs of transport format 1, TF(1), alternating with 10 TTIs of TF(2), versus 20 TTIs of TF(1) alternating with 10 TTIs of TF(2), and so on. It is likely that the target BLER will not be met with the most efficient transmit power, if at all, for all transport formats if a conventional power control mechanism is used.

Moreover, when many transport formats are used for a given transport channel, the target BLER may not need to be the same for all transport formats. For example, for a voice call, transport formats known to have insignificant voice content (e.g., background noise) may be able to tolerate higher BLERs than transport formats with voice content.

Aspects of the invention provide various techniques to more effectively and efficiently control the transmit power for a data transmission that uses a number of transport formats. Different transport formats for a given transport channel may require different target SNIRs to achieve a particular BLER. The embodiments provided herein effectively treat these different transport formats as "individual" transmissions with their own performance requirements while reducing the overall transmit power for the data transmission.

For each transport format TF(i) of a particular transport channel TrCH(k), $SNIR_{TCk,TFi}$ is the SNIR required for a received BLER of $BLER_{TCk,TFi}$, which is the target BLER for the transport format. If N transport formats are available for use, then target $SNIR_{TCk,TF1}$ through $SNIR_{TCk,TFN}$ are required to respectively achieve target $BLER_{TCk,TF1}$ through $BLER_{TCk,TFN}$ for transport formats TF(1) through TF(N). The power control mechanism can then be operated such that the proper set of target BLER and SNIR is used for each received transport format, and to provide the proper power control commands based on this set of target BLER and SNIR.

Specifying multiple individual target BLERs for each transport channel may be more efficient since different types of data may have different performance requirements. Certain data may be more critical and would require a lower target BLER. Conversely, certain other data may be less critical and can tolerate a higher target BLER. At the extreme, a "don't care" target BLER may be specified for any transport format for which the BLER does not matter, in which case the power control mechanism may be temporarily de-activated when these transport formats are used. The "don't care" target BLER may be explicitly specified (e.g., sent over the air) or implicitly specified (e.g., by not specifying any value), and may be used, for example, for NULL/DTX transport blocks.

Multiple individual target BLERs for each transport channel allow for a specification of the target BLER that is both efficient and independent of the selected transport format combination, their relative frequency of occurrence, and their order of succession. The current W-CDMA standard may be amended to support the specification of multiple target BLERs for multiple transport formats for each transport channel.

In an alternate embodiment, various power control schemes are provided to achieve different target SNIRs for different transport formats. These schemes may be used to achieve different target BLERs specified for different transport formats, which generally require different target SNIRs. These schemes may also be used even if a single target BLER is specified for all transport formats of a given transport channel, as in the current W-CDMA standard, since different transport formats may require different target SNIRs to achieve the same target BLER.

Figure 8:
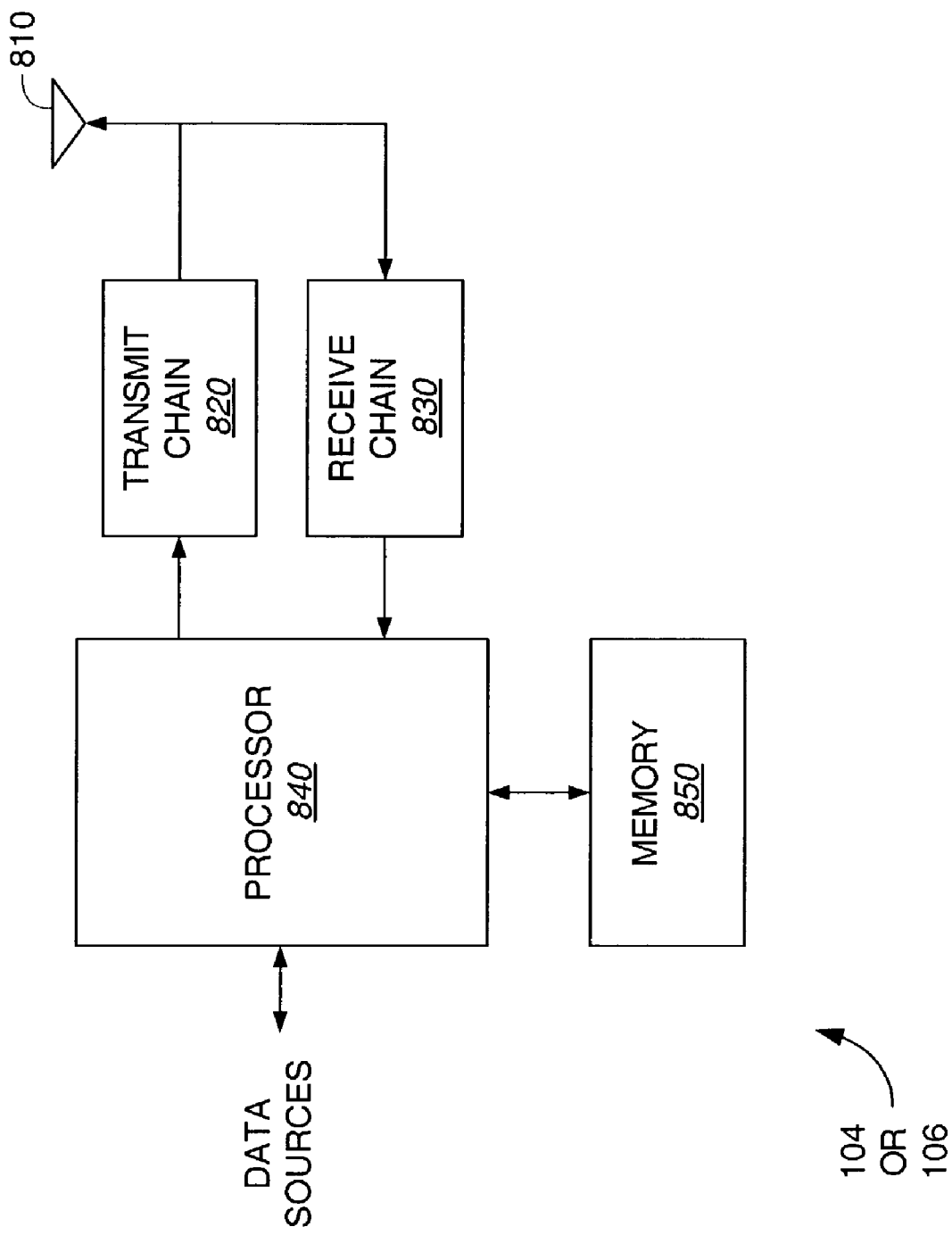
FIG. 8 depicts a portion of an exemplary wireless communication device.

FIG. 8 depicts a portion of an exemplary wireless communication device, such as base station 104 or terminal 106. Signals are received and transmitted via antenna 810. Transmitted signals are formatted in transmit chain 820 according to one or more wireless system standards, such as those listed above, deployed in system 100. Examples of components that may be included in transmit chain 820 are encoders, interleavers, spreaders, modulators of various types, amplifiers, filters, digital-to-analog (D/A) converters, radio frequency (RF) converters, and the like. Data for transmission is provided to transmit chain 820 by processor 840. In the exemplary embodiment, processor 840 provides frames of data for transmission.

Signals received at antenna 810 are processed in receive chain 830 according to one or more wireless system standards, such as those listed above, deployed in system 100. Examples of components that may be deployed in receive chain 830 include RF downconverters, amplifiers, filters, analog-to-digital (A/D) converters, demodulators, RAKE receivers, combiners, deinterleavers, decoders (Viterbi, turbo, block decoders such as BCH, etc.), and others. Data from receive chain 830 is delivered to processor 840.

Some or all of the functions of receive chain 830 and transmit chain 820 may also be carried out in processor 840, or another processor such as a Digital Signal Processor (DSP) or other general or special purpose processor. Techniques for receiving and transmitting CDMA and other system samples and demodulating/decoding or encoding to produce data symbols are known in the art, and fall within the scope of the present invention. Those of skill in the art will recognize myriad combinations of these and other components that can be deployed without deviating from the principles of the invention disclosed herein.

In alternate embodiments, processor 840 may be a Digital Signal Processor (DSP) or any general-purpose processor. Those of skill in the art will recognize that the methods and functions described herein with respect to processor 840 can also be performed using special purpose hardware, co-processors, a combination of processors or DSPs, or a combination of all of the above. Some or all of the functions attributed to various other blocks described may also be carried out in processor 840. Processor 840 will commonly contain, or be connected with, one or more memory elements 850 for storing instructions to carry out the various tasks and processes described herein as well as data storage.

Processor 840 receives data from one or more sources, as described above, and prepares it for transmission in conjunction with transmit chain 820. Processor 840 and transmit chain 820 are also responsive to messages or signals received from another wireless communication device, such as a base station 104 or terminal 106. In the exemplary embodiment, messages or signals may include power control commands or power level updates, described in further detail below.

Figure 9:
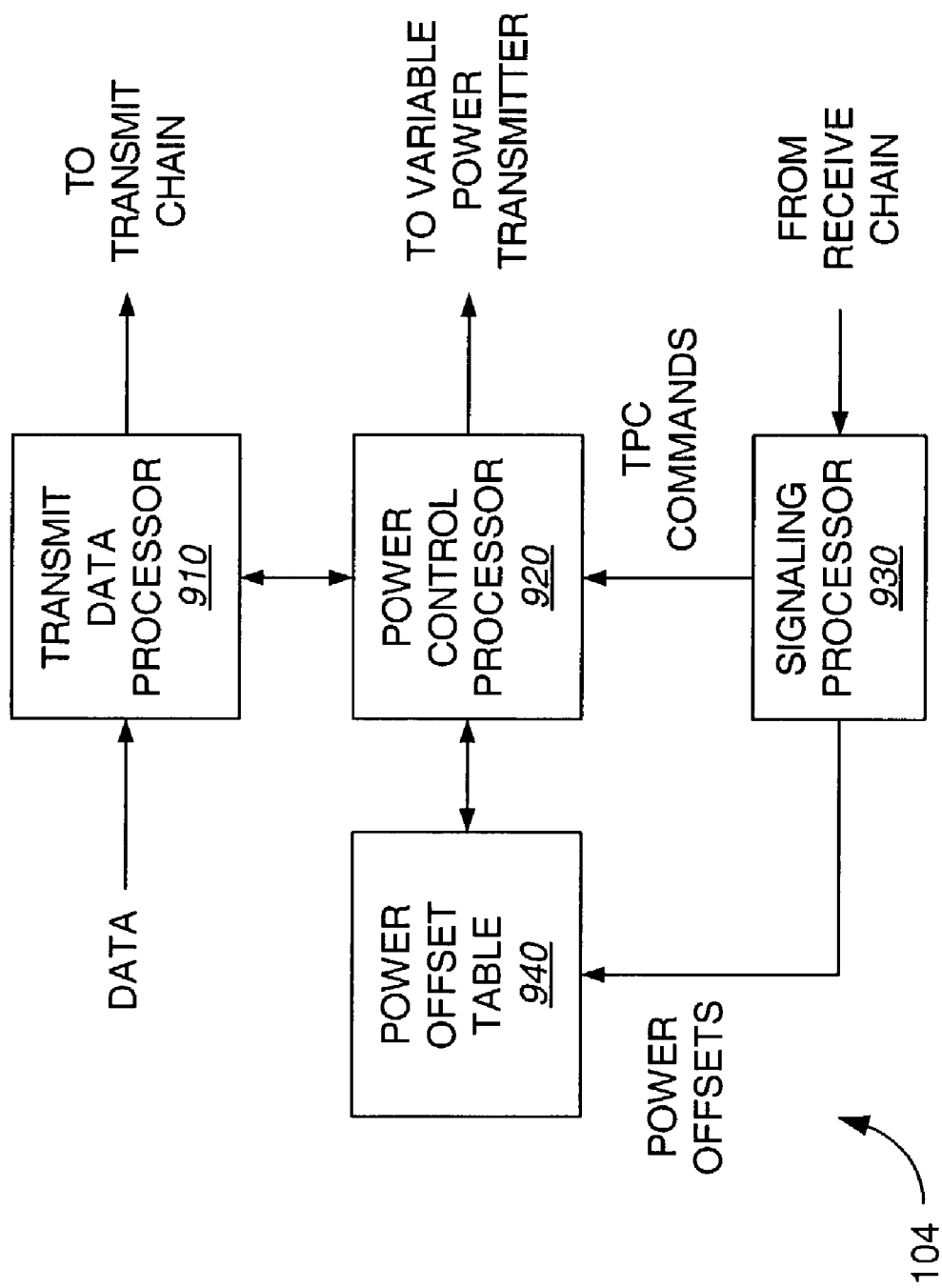
FIG. 9 details an exemplary embodiment of a portion of a base station.

FIG. 9 details an exemplary embodiment of a portion of a base station 104 for reducing interference with a multiple format channel. The blocks can be carried out as software modules in processor 840, as discrete hardware components, with one or more coprocessors, or a combination of all of the above. Instructions and data for processing the modules may be stored in a memory such as memory 850. One or more data sources deliver data (such as transport channels) to transmit data processor 910. Transport channels are conditioned according to a system or standard, such as those described above. In the exemplary embodiment, the data is conditioned according to the W-CDMA specification. Conditioned data is delivered for transmission via a transmit chain, such as transmit chain 820. Information applicable to the transport channels, such as the transport format or formats being conditioned for transmission is delivered to power control processor 920. Power control processor 920 receives Transmit Power Control (TPC) commands from a terminal 106 via signaling processor 930, as described above with respect to FIG. 7. Signaling processor 930 processes signals or messages received from a terminal 106 via a receive chain, such as receive chain 830. In this embodiment, TPC commands are delivered from signaling processor 930 to power control processor 920. Power control processor determines a power level, delivered to a variable power transmitter, such as one deployed in transmit chain 820, in accordance with the various transport channels currently being transmitted and their associated power requirements, as stored in power offset table 940.

In addition, signaling processor 930 decodes messages containing power offset updates for storage in power offset table 940. The power offsets can include various power offsets corresponding to transport formats. Power offsets for use in the presence of interference can also be signaled from the terminal 106 to the base station 104, and stored in power offset table 940. Various methods for signaling power control commands and messages are known in the art. These and myriad other combinations of known and anticipated methods for signaling power control and power offset values fall within the scope of the present invention.

Power offset table 940 stores power values associated with transport formats. In the exemplary embodiment, each transport format has a power level value for use without interference and a power level for use with interference. The non-interference power level can be stored as a power magnitude used directly to control the power level of a variable power level transmitter. Alternatively, a base power level is used and updated in response to up and down power control commands, received from signaling processor 930. The base power level is derived from calculations in the terminal of the received power of the pilot signal, as described above, and more fully in the '604 application. Power offset table 940 stores offsets, according to various transport formats, which can be added to the base level for controlling the power level of the variable power level transmitter.

Similarly, interference power levels can be stored as power magnitudes used directly to control the power level of a variable power level transmitter, or can be offsets for adding to the base power level, as just described, or for adding to the non-interference power level (since a typical power level for use in the presence of interference will be greater than that required in the absence of interference, although a lower power can be used as well within the scope of the present invention). In the exemplary embodiment, the interference offset is an added to the non-interference offset (which is added to the base power level), to determine the minimum power level for a transport format experiencing interference (detailed further below). Power levels for the various formats, for use both in interference and without, can be pre-determined, signaled from one or more terminals, or computed in response to various system conditions (including signals from one or more terminals). Those of skill in the art will recognize various formats and methods to store and update power levels in power offset table 940.

For clarity, various aspects, embodiments, and features of the power control techniques have been described specifically for the downlink power control in W-CDMA. The techniques described herein may also be used for other communication systems (e.g., other CDMA-based systems, or power-controlled systems) in which certain attributes (e.g., rates, transport formats, of formats) of a data transmission on a particular "logic channel" (e.g., a transport channel) can results in different characteristics (e.g., different target SNIRs) for the power control mechanism. The techniques described herein may thus be used for power control of different attribute values (e.g., different rates, formats, or transport formats) of a data channel (e.g., transport channel) transmitted on a power-controlled physical channel (e.g., the downlink DPCH). The techniques described herein may also be used for the uplink power control.

Figure 10:
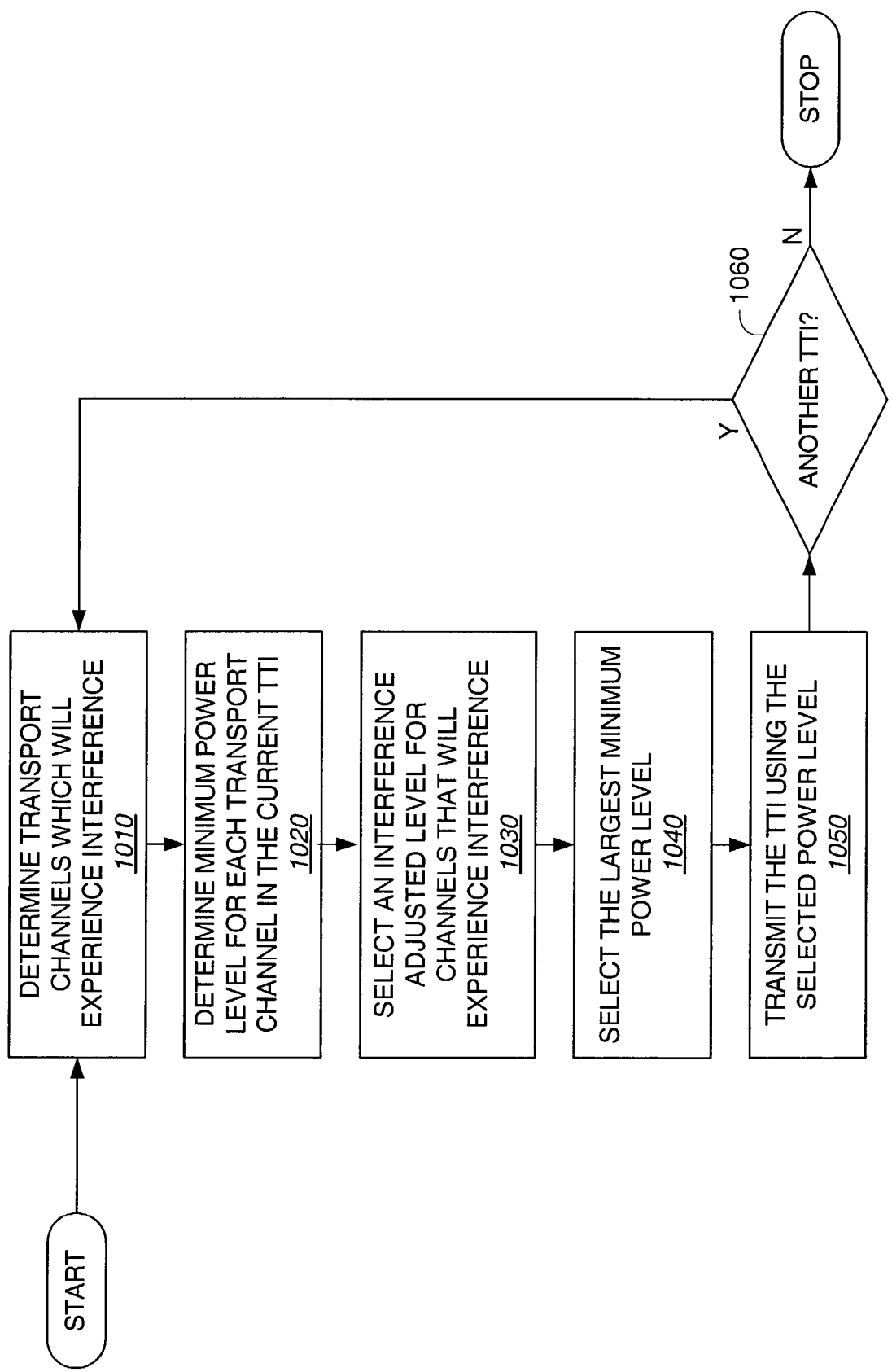
FIG. 10 depicts a flowchart of an embodiment of a method of reducing interference with a multiple format channel.

FIG. 10 depicts a flowchart of an embodiment of a method of reducing interference with a multiple format channel. The process begins at step 1010, where the transport channels which will experience interference are determined. Since the interference occurs at known times, with known duration, and the formatting, interleaving, encoding, modulating, and other procedures used in data transmission are deterministic, it is possible to know how many and which transport channels will be subject to the interference, as described above with respect to FIG. 6. In the exemplary embodiment, the interference is periodic, with a fixed duration. This is not a requirement, however. Any interference that is predictable can be mitigated using embodiments and methods described herein. For example, a transmit data processor 910 can be used to determine the transport channels being conditioned for transmission of a TTI, and can determine which channel or channels will overlap with the transmission of the SCH. The list of channels in a TTI along with an indication of interference for one or more of those channels can be delivered to power control processor 920 for use as described in the following steps. Proceed to step 1020.

In step 1020, determine the minimum power level required for each transport channel in the current TTI. Each of the one or more transport channels that can be multiplexed into a single frame, or TTI in the exemplary embodiment, may be subject to a different format and therefore different power requirements for successful transmission within the desired quality of service parameters. The mix of various formats can change from frame to frame (or from TTI to TTI, in the exemplary embodiment). In the exemplary embodiment, the minimum power level requirements for each transport format are stored in a power offset table 940. Power control processor 920 can retrieve the necessary minimum power levels for each format in the list of formats determined in transmit data processor 910. As described above, the minimum power levels can determined and stored in any number of ways. The minimum power levels may be pre-determined, or calculated in response to system characteristics and/or feedback from one or more terminals, etc. The minimum power levels may be offsets from a base power level, such as one determined in response to received signal strength of a common signal or portion of a signal, such as a pilot. Proceed to step 1030.

In step 1030, select an interference adjusted power level for channels that will experience interference. These power levels can be determined in any of the manners described in step 1020 above. The interference adjustments may vary in response to changing terminal geometry. The interference power levels may be stored as power level magnitudes, with the interference or non-interference magnitude selected in accordance with the results of step 1010. In the exemplary embodiment, the interference adjustments for channels that will experience interference is made by adding an offset to the minimum power level that would otherwise have been used. Proceed to step 1040.

In step 1040, the largest of the minimum power levels, as determined in step 1020 and adjusted in step 1030, is selected. The minimum required power level for all the formats in a TTI is determined by the most stringent, or largest, power requirement. Note that during this step, it is possible for a minimum power level for a non-interference transport channel to be selected. In these cases, the power used to transmit the TTI will be sufficient to receive the interfered-with channels at the desired quality without any increase in power to overcome the interference. Transmit power is not increased unless necessary, thus increasing overall system capacity. Proceed to step 1050.

In step 1050, transmit the frame (or TTI, in the exemplary embodiment) using the power level selected in step 1040.

Note that, in certain embodiments employing power control, the power control loop may attempt to counteract any sudden increase in transmit power due to the state of the power control loop and the setpoints within it, without some way of knowing the power change is due to a change in format. To counter this effect, various means for informing a terminal of format changes can be deployed. For example, a terminal may use a predictive algorithm based on received and decoded frames to estimate the format type in the next frame. The upcoming frame type may be signaled to the terminal. A set pattern of frame types can be deployed. Or, the terminal may decode the frame header as it arrives to determine its contents. Alternatively, the terminal can perform the power control loop on a portion of the received signal that is constant across the various transport channel formats, such as the pilot. These procedures are described in further detail in the '604 application.

Proceed to decision block 1060. The process can be repeated each frame (or TTI, in the exemplary embodiment). If another TTI is ready for conditioning, proceed back to step 1010 to repeat the process. If not, the process stops.

It should be noted that in all the embodiments described above, method steps can be interchanged without departing from the scope of the invention. Those of skill in the art will recognize that the steps described in FIG. 10 may occur in parallel, or in different order, or in a combination of the two.

Note that the foregoing discussion has used the signals, codes and parameters defined in the W-CDMA standard as some of the exemplary signals, codes and parameters. This is for clarity of discussion only, and should not be construed to limit the scope of the present invention to W-CDMA systems. The principles of the present invention apply to any conceivable system in which predictable interference affects one or more of a channel comprised of multiple formats, as described above. Those skilled in the art will recognize how to adapt the various embodiments described for use with such alternate systems.

Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The or and the storage medium may reside in an ASIC. The ASIC may in a user terminal. In the alternative, the processor and the storage may reside as discrete components in a user terminal.

The previous description of the disclosed embodiments is provided to any person skilled in the art to make or use the present invention. modifications to these embodiments will be readily apparent to those in the art, and the generic principles defined herein may be applied to embodiments without departing from the spirit or scope of the invention. the present invention is not intended to be limited to the embodiments herein but is to be accorded the widest scope consistent with the principles and novel features disclosed herein.

What is claimed is:

1. An apparatus being operable with a signal comprising at least one frame, comprising:
 a variable power level transmitter, for transmitting the signal at various power levels in response to a power level signal; and
 a processor for:
  determining a plurality of minimum power levels of the transmitter required for respectively transmitting a plurality of portions of the frame,
  increasing each of the minimum power levels if there will be deterministic interference from the transmitter resulting from the transmission of the respective portion of the frame;
  selecting the highest power level of the plurality of minimum power levels after any increments, wherein the increments are based on interference power levels; and
  generating the power level signal in accordance with the highest power level.

2. The apparatus of claim 1, further comprising a table for storing the interference power levels.

3. The apparatus of claim 2, wherein the table further stores the minimum power levels.

4. The apparatus of claim 1, wherein the interference power levels are pre-determined.

5. The apparatus of claim 1, further comprising a receiver for receiving power level information generated in response to the transmitted signal.

6. The apparatus of claim 5, wherein the power level information comprises one or more minimum power levels.

7. The apparatus of claim 5, wherein the power level information comprises one or more interference power levels.

8. The apparatus of claim 1, wherein the interference power levels are determined in response to varying geometry between two wireless communication devices.

9. The apparatus of claim 1, wherein the minimum power levels are increased by adding at least one of the interference power levels to a base minimum power level.

10. The apparatus of claim 9, wherein the base minimum power is power controlled.

11. The apparatus of claim 9, wherein the base minimum power is comprised of a format dependent offset added to a normalized power level.

12. The apparatus of claim 11, wherein the normalized power level is determined in accordance with a closed-loop power control mechanism.

13. The apparatus of claim 1, wherein the minimum power levels are updated in accordance with a closed-loop power control mechanism.

14. The apparatus of claim 1, wherein the interference power levels are updated in accordance with a closed-loop power control mechanism.

15. The apparatus of claim 1, wherein the minimum power levels are increased by selecting at least one of the interference power levels.

16. The apparatus of claim 1, wherein at least one of the interference power levels are comprised of a format dependent offset added to a normalized power level.

17. A base station being operable with a signal comprising at least one frame, comprising:
- an antenna;
- a variable power level transmitter, for transmitting via the antenna the signal at various power levels in response to a power level signal; and
- a processor for:
  - determining a plurality of minimum power levels of the transmitter required for respectively transmitting a plurality of portions of the frame;
  - increasing each of the minimum power levels if there will be deterministic interference from the transmitter resulting from the transmission of the respective portion of the frame;
  - selecting the highest power level of the plurality of minimum power levels after any increments; and
  - generating the power level signal in accordance with the highest power level.

18. A method of reducing interference associated with transmitting at least one frame, comprising:
- determining a plurality of minimum power levels of a transmitter required for respectively transmitting a plurality of portions of the frame;
- increasing each of the minimum power levels if there will be deterministic interference from the transmitter resulting from the transmission of the respective portion of the frame;
- selecting the largest of the minimum power levels as a transmit power level after any increments, wherein the increments are based on interference power levels; and
- transmitting the frame in accordance with the transmit power level.

19. The method of claim 18, wherein the minimum power levels are updated in accordance with a closed loop power control mechanism.

20. The method of claim 18, wherein the minimum power increase is computed based on a spreading factor associated with the channel.

21. The method of claim 18, wherein the minimum power levels are computed based on the geometry of a wireless communication device receiving the transmitted signal.

22. The method of claim 18, wherein the portions are associated with at least one format and the minimum power levels required for each of the at least one format are determined by selecting a power level associated with that format from a power level table.

23. The method of claim 22, wherein the minimum power level for an interfered with channel is selected from the interference power levels stored in the table.

24. The method of claim 22, wherein the minimum power level for an interfered with channel is determined by selecting a non-interference power level stored in the table, selecting an interference offset stored in the table, and adding the offset to the non-interference power level to produce the minimum power level for the interfered with channel.

25. An apparatus for wireless communication, comprising:
- means for determining a plurality of minimum power levels of a transmitter required for respectively transmitting a plurality of portions of a frame;
- means for increasing each of the minimum power levels if there will be deterministic interference from the transmitter resulting from the transmission of the respective portion of the frame;
- means for selecting the largest of the minimum power levels as a transmit power level after any increments, wherein the increments are based on interference power levels; and
- a transmitter for transmitting the frame in accordance with the transmit power level.

26. The apparatus of claim 25, further comprising means for selecting one or more of the interference power levels stored in a table.

27. Computer-readable media including computer-executable instructions for performing the steps of:
- determining a plurality of minimum power levels of a transmitter required for respectively transmitting a plurality of portions of a frame;
- increasing each of the minimum power levels if there will be deterministic interference from the transmitter resulting from the transmission of the respective portion of the frame;
- selecting the largest of the minimum power levels as a transmit power level after any increments, wherein the increments are based on interference power levels; and
- transmitting the frame in accordance with the transmit power level.

28. The computer-readable media of claim 27, further including computer-executable instructions for performing the step of selecting one or more of the interference power levels stored in a table.

29. The method of claim 18, wherein the minimum power level is determined in part based upon a target Block Error Rate (BLER).

30. The apparatus of claim 1, wherein at least one of the increments is based on known time and duration of the deterministic interference with the respective portion.

31. The device of claim 17, wherein at least one of the increments is based on known time and duration of the deterministic interference with the respective portion.

* * * * *